United States Patent [19]

Nishii et al.

[11] Patent Number: 5,465,162

[45] Date of Patent: Nov. 7, 1995

[54] IMAGE RECEIVING APPARATUS

[75] Inventors: Teruyuki Nishii, Yokohama; Tsunehiro Watanabe, Kawaguchi; Hisao Terajima, Yokohama, all of Japan

[73] Assignee: Canon Kabushiki Kaisha, Tokyo, Japan

[21] Appl. No.: 323,070

[22] Filed: Oct. 14, 1994

Related U.S. Application Data

[63] Continuation of Ser. No. 878,394, May 4, 1992, abandoned.

[30] Foreign Application Priority Data

May 13, 1991 [JP] Japan .................. 3-137134

[51] Int. Cl.⁶ .................................................. H04N 1/32
[52] U.S. Cl. ............................ 358/442; 358/444; 379/94; 379/100; 379/212
[58] Field of Search ..................... 358/400, 401, 358/402, 434, 438, 439, 440, 442, 443, 444, 468; 375/8; 379/93, 94, 96, 100, 156, 165, 166, 212, 213, 219, 225, 233, 234

[56] References Cited

U.S. PATENT DOCUMENTS

| | | |
|---|---|---|
| 3,914,539 | 10/1975 | Hashimoto . |
| 4,491,873 | 1/1985 | Takayama ......................... 358/256 |
| 4,521,805 | 6/1985 | Ayata et al. ........................ 358/75 |
| 4,677,649 | 6/1987 | Kunishi et al. .................... 375/122 |
| 4,677,660 | 6/1987 | Yoshida ............................ 379/100 |
| 4,719,514 | 1/1988 | Kurahayashi et al. ............ 358/261 |
| 4,772,955 | 9/1988 | Kurahayashi et al. ............ 358/257 |
| 4,773,080 | 9/1988 | Nakajima et al. .................. 375/5 |
| 4,785,355 | 11/1988 | Matsumoto ........................ 358/257 |
| 4,800,439 | 1/1989 | Yoshino ............................ 358/257 |
| 4,815,121 | 3/1989 | Yoshida ............................ 379/67 |
| 4,837,806 | 6/1989 | Watanabe .......................... 379/93 |
| 4,843,479 | 6/1989 | Yoshino et al. ................... 358/257 |
| 4,845,569 | 7/1989 | Kurahayashi et al. ............ 358/400 |
| 4,864,602 | 9/1989 | Yamamoto et al. ............ 358/434 X |
| 4,878,123 | 10/1989 | Miura et al. ...................... 358/401 |
| 4,897,831 | 1/1990 | Negi et al. ......................... 370/29 |
| 4,932,048 | 6/1990 | Kemochi et al. .................. 379/67 |
| 4,956,723 | 9/1990 | Toda .................................. 358/449 |
| 4,991,203 | 2/1991 | Kakizawa .......................... 379/209 |
| 5,001,744 | 3/1991 | Nishino et al. . |
| 5,003,583 | 3/1991 | Iggulden et al. ................. 379/100 |
| 5,020,096 | 5/1991 | Sakakibara et al. .............. 379/100 |
| 5,048,076 | 9/1991 | Maurer et al. .................... 379/94 |
| 5,093,857 | 3/1992 | Yoshida et al. .................. 379/100 |
| 5,111,307 | 5/1992 | Yoshino ............................ 358/407 |
| 5,153,912 | 10/1992 | Sakakibara et al. . |
| 5,164,982 | 11/1992 | Davis . |
| 5,185,784 | 2/1993 | Nashimoto ........................ 379/94 |
| 5,193,110 | 3/1993 | Jones et al. . |
| 5,222,126 | 6/1993 | Nishino ............................ 379/100 |
| 5,291,549 | 3/1994 | Izumi ................................. 379/233 |
| 5,315,643 | 5/1994 | Yoshida et al. ................ 358/438 X |

*Primary Examiner*—Bentsu Ro
*Attorney, Agent, or Firm*—Fitzpatrick, Cella, Harper & Scinto

[57] ABSTRACT

An image communication apparatus which is capable of accommodating an extention line terminal comprises a communication unit for receiving an image signal from a line and sending the image signal to the extention line terminal, a memory unit for storing the image signal received by the communication unit from the line, a recorder for recording the image signal received by the communication unit from the line and connection unit for selectively connecting the extention line, the communication unit and the line. The communication unit sends the image signal stored in the memory unit to the extention line terminal through the connection unit.

13 Claims, 12 Drawing Sheets

IMAGE RECEIVING APPARATUS

This application is a continuation of application Ser. No. 07/878,394 filed May 4, 1992, now abandoned.

BACKGROUND OF THE INVENTION

1. Field of the Invention

The present invention relates to an image receiving apparatus having an image signal receiving function.

2. Related Background Art

In the past, when a plurality of facsimile devices are to be used, at least the same number of communication lines as the number of facsimile devices are required, and one or more lines are connected to each of the communication lines.

In the prior art apparatus, where facsimile devices are installed one for each of first floor and second floor of one building but the entire communication amount is not large enough to require one line, the efficiency to use the line by the facsimile device is low and an operational inconvenience such as the need to bring a facsimile text received in the first floor to the second floor, for example, is included. A sender may need to send the same text to the first floor and the second floor of the same building. This is a disadvantage in terms of cost and time, and inconvenient in the operation because two telephone numbers are to be recorded.

SUMMARY OF THE INVENTION

It is an object of the present invention to provide an improved image communication apparatus which can record a received image by a record unit of the image communication apparatus or an extention line terminal.

It is another object of the present invention to provide an image communication apparatus which can manage results of communication done by a communication unit of the image communication apparatus or the extention line terminal.

It is other object of the present invention to provide an image communication apparatus which records a received image by the record unit of the image communication apparatus or one of a plurality of extent ion line terminals determined by a time.

It is other object of the present invention to provide an image communication apparatus which records a received image by the record unit of the image communication apparatus or one of a plurality of extention line terminals determined by a sending station.

It is other object of the present invention to provide an image communication apparatus having a record unit, which determines whether a destination station is an image transmission apparatus or not and sends a call signal to an extention line terminal in accordance with the determination.

It is other object of the present invention to provide an image communication apparatus which stores a received image in a memory when the record unit cannot record it, and sends the image stored in the memory to an extention line terminal.

It is other object of the present invention to provide an image communication apparatus which stores a received image in a memory when a size of the received image and a record size of the record unit do not match, and sends the image stored in the memory to an extention line terminal.

Other objects of the present invention will be apparent from the following description of the preferred embodiments.

DETAILED DESCRIPTION OF THE PREFERRED EMBODIMENTS

Figure 1:
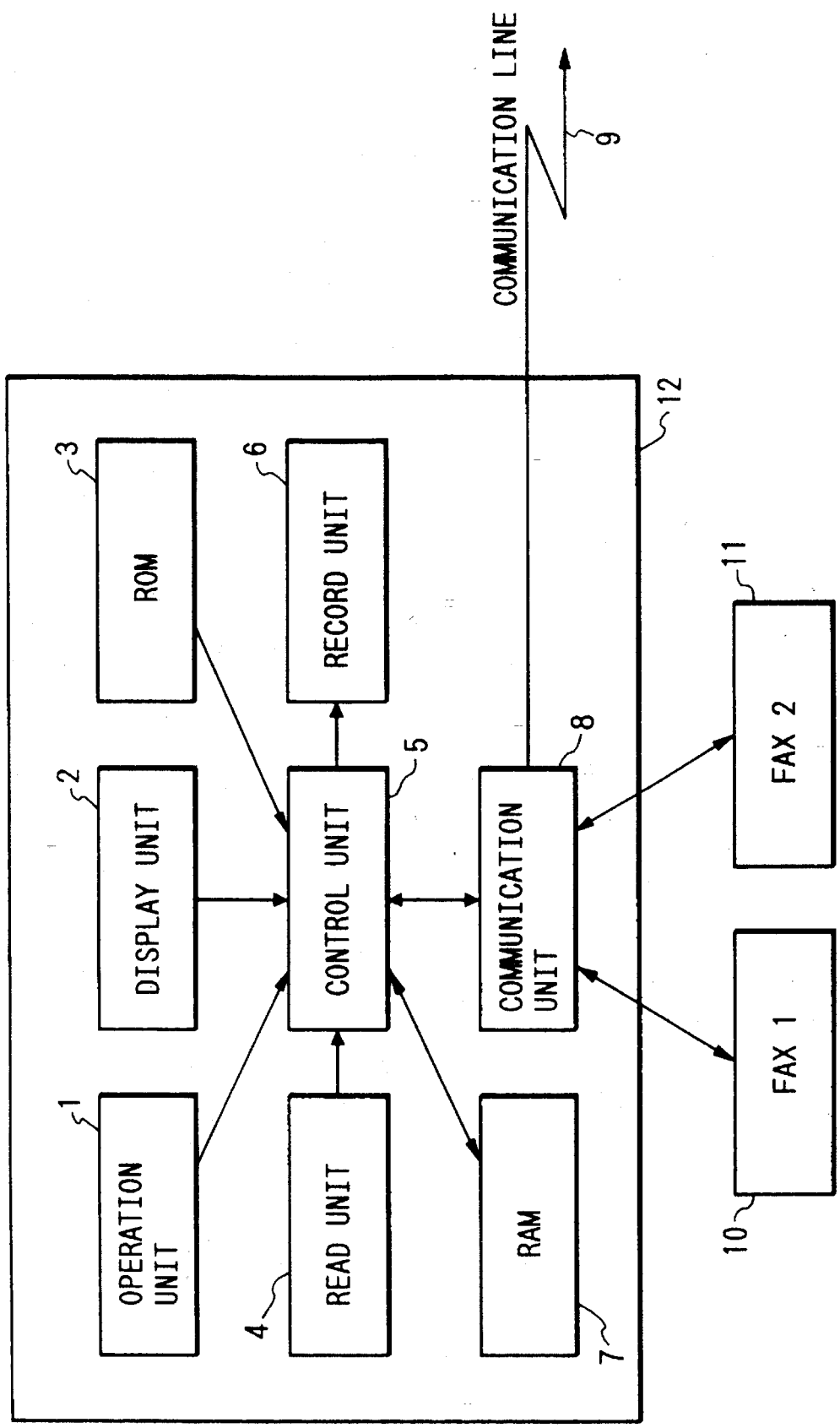
FIG. 1 shows a block diagram of a first embodiment of the present invention.

FIG. 1 shows a block diagram of one embodiment.

The present embodiment relates to a system having a facsimile device (FAX 0) 12 as a master unit and two facsimile devices (FAX 1, FAX 2) 10 and 11 as slave units.

The facsimile device 12 comprises a control unit 5 including a microprocessor and controls the overall operation by a control program stored in a ROM 3. The facsimile device 12 also conducts dialing and registration by a console unit 1 and displays status and parameters for registration by a display unit 2.

In a facsimile send mode, it reads a document sheet by a reader 4, encodes the read data and sends it through a communication unit 8 and a communication line 9. On the other hand, in a receive mode, it decodes the image data received through the communication line 9 and the communication unit 8 and prints it out by a recorder 6. A RAM 7 is used to hold the registered parameters and store sending and received images.

Figure 2:
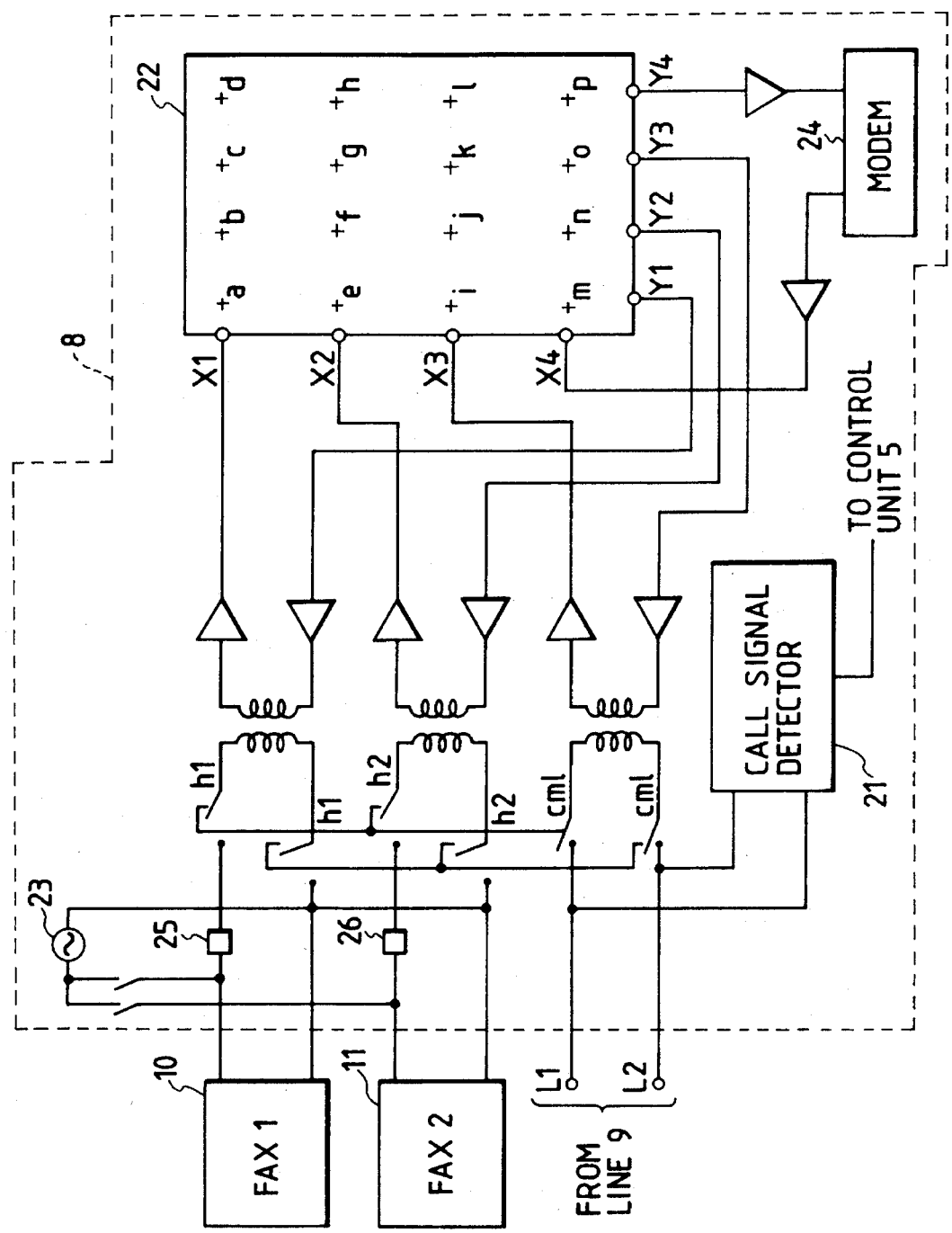
FIG. 2 shows a circuit diagram of a configuration of a communication unit in the first embodiment.

FIG. 2 shows a circuit diagram of a configuration of the communication unit 8.

The communication unit 8 comprises a detector 21 for detecting a call signal from the line 9, a crosspoint switch (multi-point analog switch) 22 for switching the connection between the facsimile devices 10, 11 and 12 and the line 9, a generator 23 for generating the call signal, a modem 24 and acknowledge detectors 25 and 26. The communication unit 8 is provided with a CML relay, relays h1 and h2 and a hybrid transformer.

As shown in FIG. 2, the slave facsimile devices 10 and 11 are connected to the communication unit 8 through the crosspoint switch 22. By switching the crosspoint switch 22, the slave facsimile device is connected to the communication line 9, the master facsimile device, or the other slave facsimile device. The configuration of the facsimile devices 10 and 11 may be identical to that of the master facsimile device or one without the multi-point switch 22.

Figure 3:
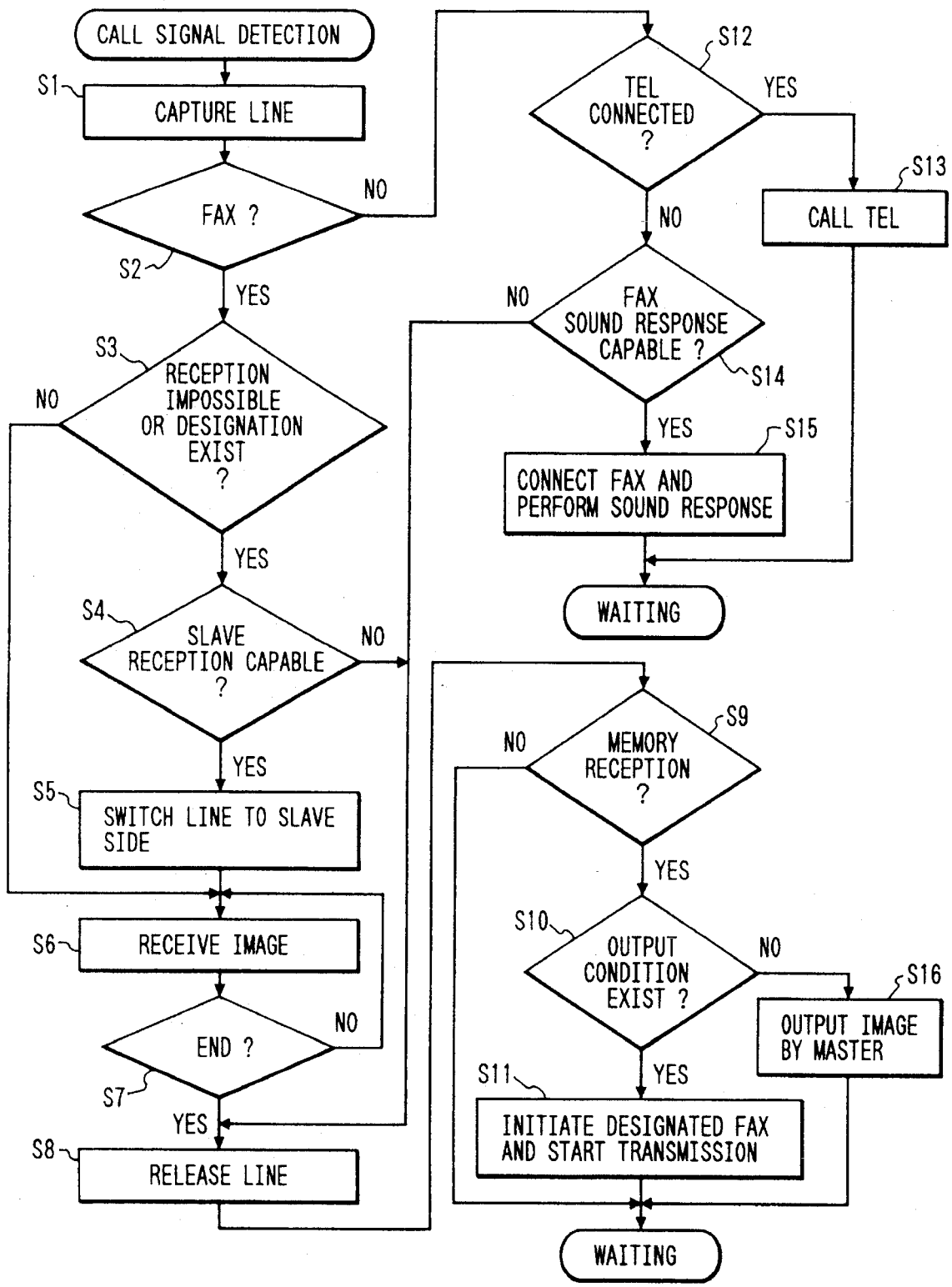
FIG. 3 shows a flow chart of an operation in the first embodiment.

FIG. 3 shows a flow chart of an operation of the present embodiment.

When the control unit 5 detects a call signal by the call signal detector 21, it turns on the CML relay and controls the multi-point switch 22 to connect the line 9 with a modem 24 to capture the line (S1). If a priority for the use of the facsimile device 10 or 11 is preset in the RAM 7, the master facsimile device 12 gives a priority to that slave facsimile device and the other slave facsimile device does not capture the line. In a slave device priority mode, the control unit 5 turns on the CML relay, turns on one of the relays h1 and h2 and controls the multi-point switch 22 to connect the line 9 to the prioritized slave device.

After the control unit 5 has captured the line, it determines by the modem 24 whether a calling station is a facsimile device or a telephone set (S2). If it is the telephone set, the control unit 5 refers the RAM 7 to determine whether the connection of telephone sets to the facsimile devices 10 and 11 have been registered or not (S12). If the telephone sets have been connected, the call signal generator 23 is caused to send a ringing signal to the telephone set to inform the call (S13). Since the priority of the facsimile devices 10 and 11 are preset in the RAM 7, fine control such as call to a representative phone number or call to both stations may be executed.

Where the telephone set is not connected in S12 and if the registration in the RAM 7 indicates that the facsimile device 10 or 11 has a voice response or recording function (S14), that facsimile device is activated by the call signal generator 23 (S15). The activated facsimile device responses by voice.

Where the sending station is a facsimile device in S2, the control unit 5 checks if the registration in the RAM 7 indicates that the recorder 6 or the RAM 7 is ready to receive data and one of the slave facsimile devices 10 and 11 is designated for the reception (S3). If the recorder 6 or the RAM 7 can receive the data or the designation of the slave device for the reception is not made, the image data is received by the recorder 6 or the RAM 7 (S6).

Where the recorder 6 is not ready to receive the data because of no record sheet, a jam at a cutter or the opening of a cover, or one of the slave facsimile devices 10 and 11 is designated for the reception (S3), the RAM 7 is referred to check if the designated slave facsimile device is ready to receive (S4). If it is ready, the call signal generator 23 is caused to call the slave facsimile device. When the slave facsimile device responds to it, the control unit 5 controls the crosspoint switch 22 to switch the line to that facsimile device (S5). The slave facsimile device then receives the image data.

When the slave device designated for the reception is not ready to receive, the data is received by the RAM 7. If the master facsimile device 12 is not ready to receive, whether other facsimile device is ready to receive or not is checked, and if there is a facsimile device which is ready to receive, the image data is received by that device. If none of the facsimile devices is ready to receive, the line is released (S8).

When the facsimile device to receive the image data is switched due to the not ready condition, the error condition may be informed to an operator by adding a message such as "Facsimile device n: Inspect record sheet" in a communication management report of the device 12.

Whether the facsimile devices are ready to received or not is informed to the control unit 5 by sending the not ready information. For example, when the facsimile device is not ready to receive after it has received the previous data, the master facsimile device 12 is automatically activated to inform it to the control unit 5 by a protocol signal or a DTMF signal. After an operator has set record sheets, the release of the not ready condition is informed to the control unit 5 by sending the DTMF signal by the facsimile device or an associated telephone set.

When the reception of the image data is completed (S7), the control unit 5 releases the line 9 (S8) and checks whether the communication was made in the memory receive mode or not (S9). If it is not in the memory receive mode, the control unit 5 returns to a stand-by mode. If it is in the memory receive mode, it checks if an output condition has been registered in the RAM 7 or not (S10), and if it has not been registered, the data is printed out by the recorder 6 (S16).

When the output condition has been registered, the designated facsimile device is activated and the image data is sent from the RAM 7 to output the received image (S11). Where a plurality of destination stations are designated, the slave facsimile devices are sequentially called by the call signal generator 23 and the data is sent from the memory through the extention line.

Where the master facsimile device 12 is not ready to receive, the image data may be transferred to the facsimile device which is ready to receive, through the extention line so that it is printed out. The transferred station may output a communication management report so that the user recognizes it.

Where the modem 24 has a high speed communication function such as 14.4 Kbps or an error-free function such as ECM, the image signal from the line 9 is received by the RAM 7. After the memory reception, a desired slave facsimile device is called to send the image signal thereto from the RAM 7 through the extention line. In this manner, high quality transmission to the slave facsimile device which has no high speed communication function or error-free communication function is attained at a low cost. Thus, the communication cost is reduced by the high speed, the error-free transmission is attained between the external lines, and high quality transmission with a low error rate is attained between the extention lines.

The control operation for the reception has been described above. In the transmission mode, a document sheet to be sent is transferred from the slave facsimile device to the master facsimile device 12 through the extention line and it is sent to the destination station by the high quality and high speed transmission function of the master facsimile device 12. The communication through the extention line is usually free of charge and the error rate is low to compare with the communication through the extention line. Accordingly, high quality communication is attained even by a slave facsimile device which has no high speed and error-free transmission function, and the communication fee is reduced.

Figure 4:
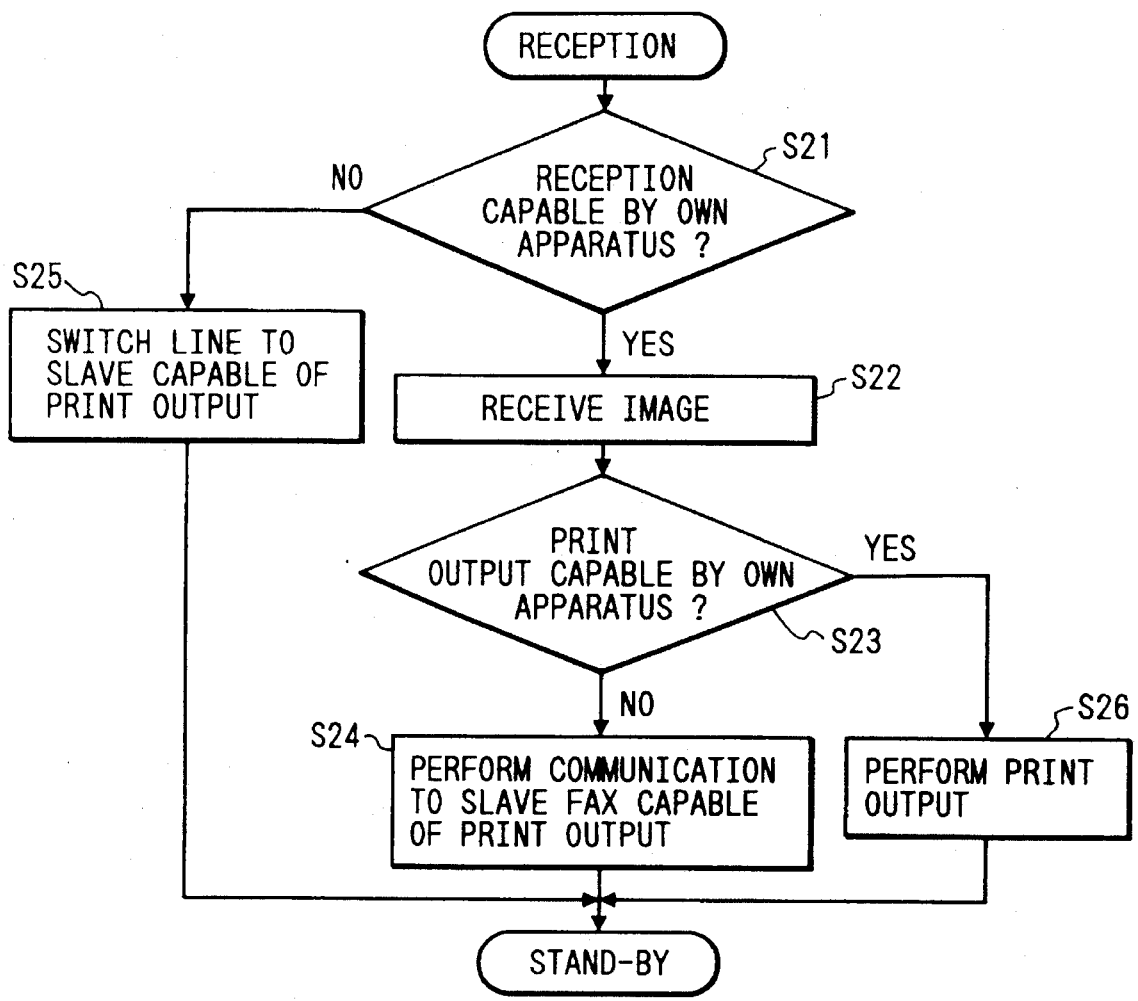
FIG. 4 shows a flow chart of an operation in a second embodiment.

FIG. 4 shows a flow chart of a reception operation in a second embodiment of the present invention.

In the second embodiment, if the device 12 is not ready to print out the received image because of no record sheet or failure in a cutter in the facsimile reception mode (S21), the control unit 5 does not directly respond to a call signal from a switch board but controls the multipoint switch 22 to switch the line to the slave facsimile device which is ready to print (S25).

Where the device 12 is not ready to print but is ready to receive by the memory (S21), it temporarily receives the image in the RAM 7 (S22). After the communication, the control unit 5 checks the status of the recorder 6 (S23), and if it is ready to print, it causes the recorder 6 to print it out (S26). If the recorder 6 is not ready to print, the control unit 5 switches the cross-point switch 22 of the communication unit 8. It activates the slave facsimile device by a psudo-call signal from the call signal generator 23, reads the received image from the RAM 7 and sends it to the slave facsimile device to print it out (S24).

Whether the slave facsimile device is ready to print or not may be determined in a preprotocol in the actual communication with the slave device, or it may be informed by the DTMF signal by activating the master device by the slave device when the status of the slave device is changed.

Figure 5:
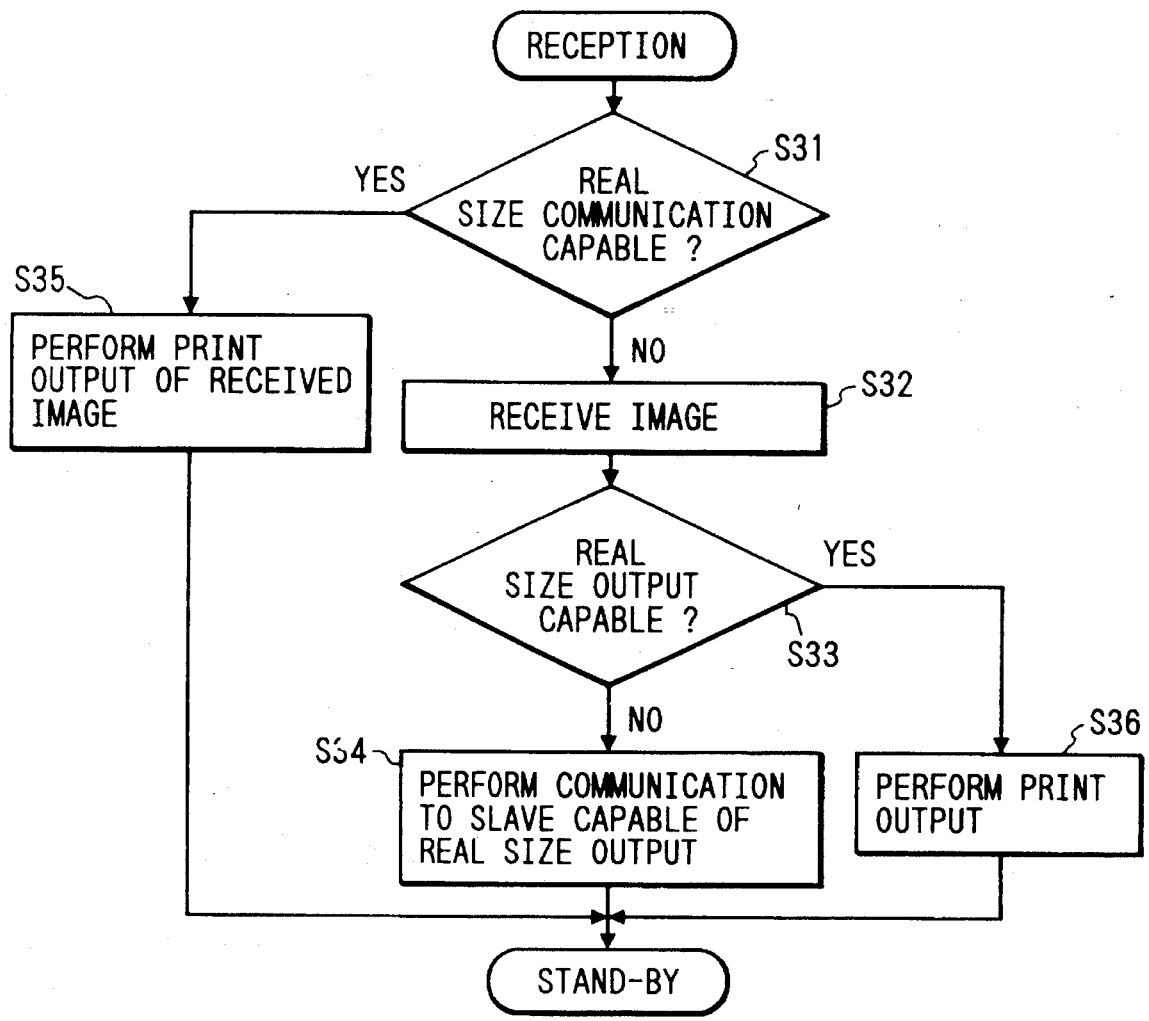
FIG. 5 shows a flow chart of an operation in a third embodiment.

FIG. 5 shows a flow chart of a reception operation in a third embodiment of the present invention.

In the third embodiment, the control unit 5 determines the size of the document sheet at the sending station by the preprotocol signal (DIS at the receiving station and DCS at the sending station) received by the modem 24 to compare it with the size of the record sheet in the recorder 6. If a unity magnification communication is permitted (S31), the image data is received as it is and the received image data is decoded and printed out by the recorder 6 (S35).

If the unity magnification communication is not permitted (S31), the image data is temporarily received by the RAM 7 (S32). The size of the communication document is matched to the size of the sending document. After the communication, the status of the recorder 6 is checked again and if it is ready to print out at the unity magnification (S33), the received image data is decoded and printed out (S36).

If the printout at the unity magnification is not permitted, the control unit 5 refers the RAM 7 after the communication to determine the size of the record sheets set in the slave facsimile device. It switches the cross-point switch 22 of the communication unit 8 and activates the slave device which is ready to print out the received document at the unity magnification, by a pseudo-call signal from the call signal generator 23 to communicate the image and print it out (S34).

Whether the slave device is ready to print at the unity magnification or not may be determined in the preprotocol in the communication with the slave device, or the master device may be activated when record sheets of different size than that of the previous sheets are set in the slave device, to inform it by the DTMF signal. Since the size of the record sheet in the slave device is known, it is not necessary to communicate that the printout at the unity magnification is not permitted.

If none of the slave device is permitted to print out at the unity magnification, an alarm sound may be generated, or a message such as "Set record sheets of size XX" may be displayed by the display unit, or printout with size reduction may be effected by the device having a widest record sheet.

Figure 6:
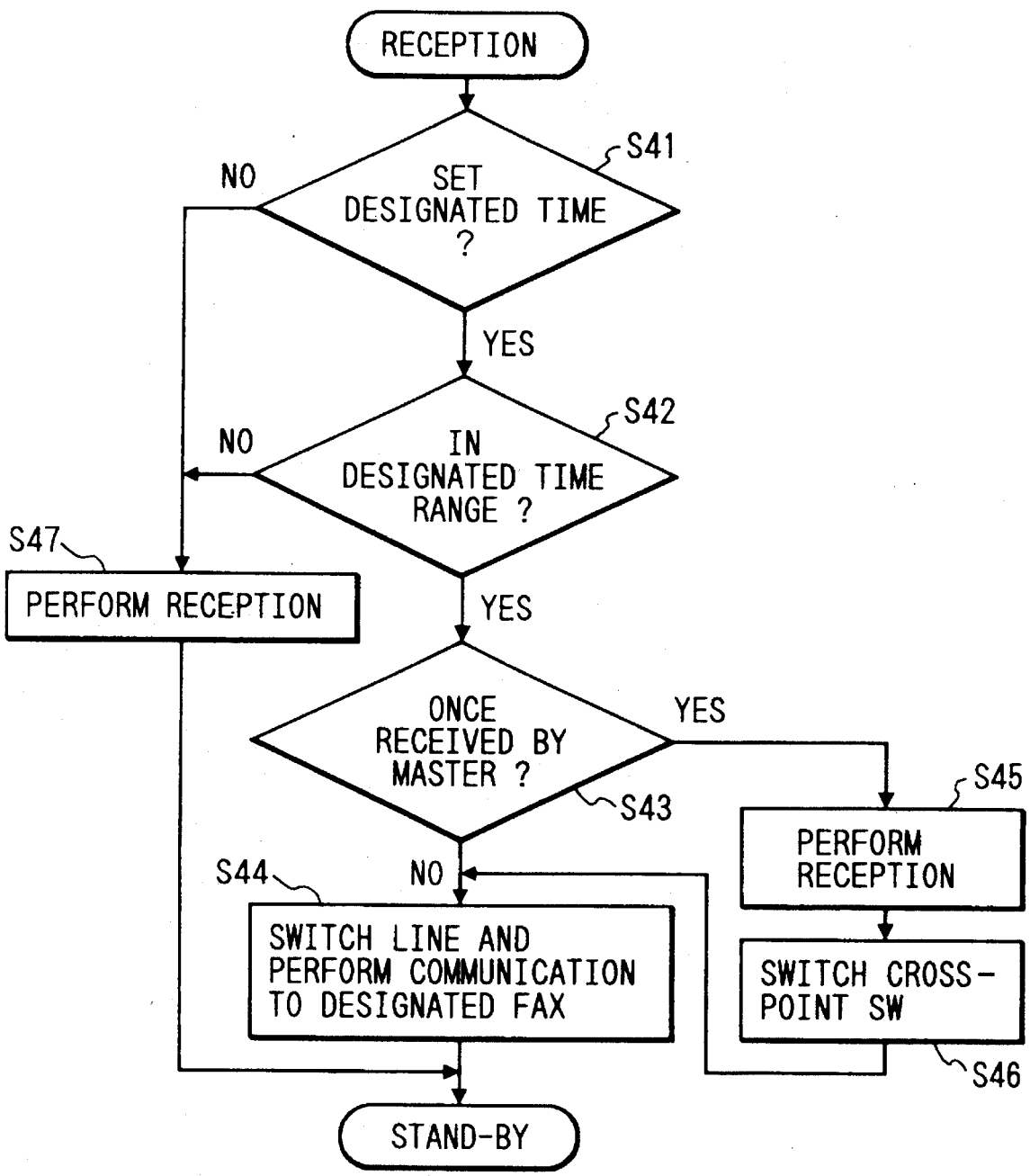
FIG. 6 shows a flow chart of an embodiment in a fourth embodiment.

FIG. 6 shows a flow chart of a reception operation in a fourth embodiment of the present invention.

In the fourth embodiment, the control unit 5 refers the RAM 7 to determine if the receiver has been designated by time by an operator or not (S41). If it has not been designated, the facsimile autoreception is effected by the master device (S47).

If the designation by time has been made in S41, the presence of the designated device is checked (S42), and if it is not present, the facsimile reception is effected by the master device (S47). If there is a corresponding device in the designated time frame, the control unit 5 refers the RAM 7 to determine whether the facsimile reception is to be made by the master device or not (S43). This process is required to utilize the function of the master device at a maximum extent when the communication function of the slave device is inferior to the master device. It is not necessary when the communication function of the slave device is not inferior to the master device.

If the reception by the master device is not necessary, the control unit 5 controls the multi-point switch 22 to connect the communication line to that facsimile device (S44). The connected slave device effects the facsimile reception. When the reception is to be made by the master device, the facsimile reception is effected by the RAM 7 (S45) and the cross-point switch 22 is switched after the reception. Then, the control unit 5 activates the slave facsimile device by the pseudo-call signal from the call signal generator 23 to read the received image from the RAM 7 to effect the facsimile communication through the extention line (S46).

Figure 7:
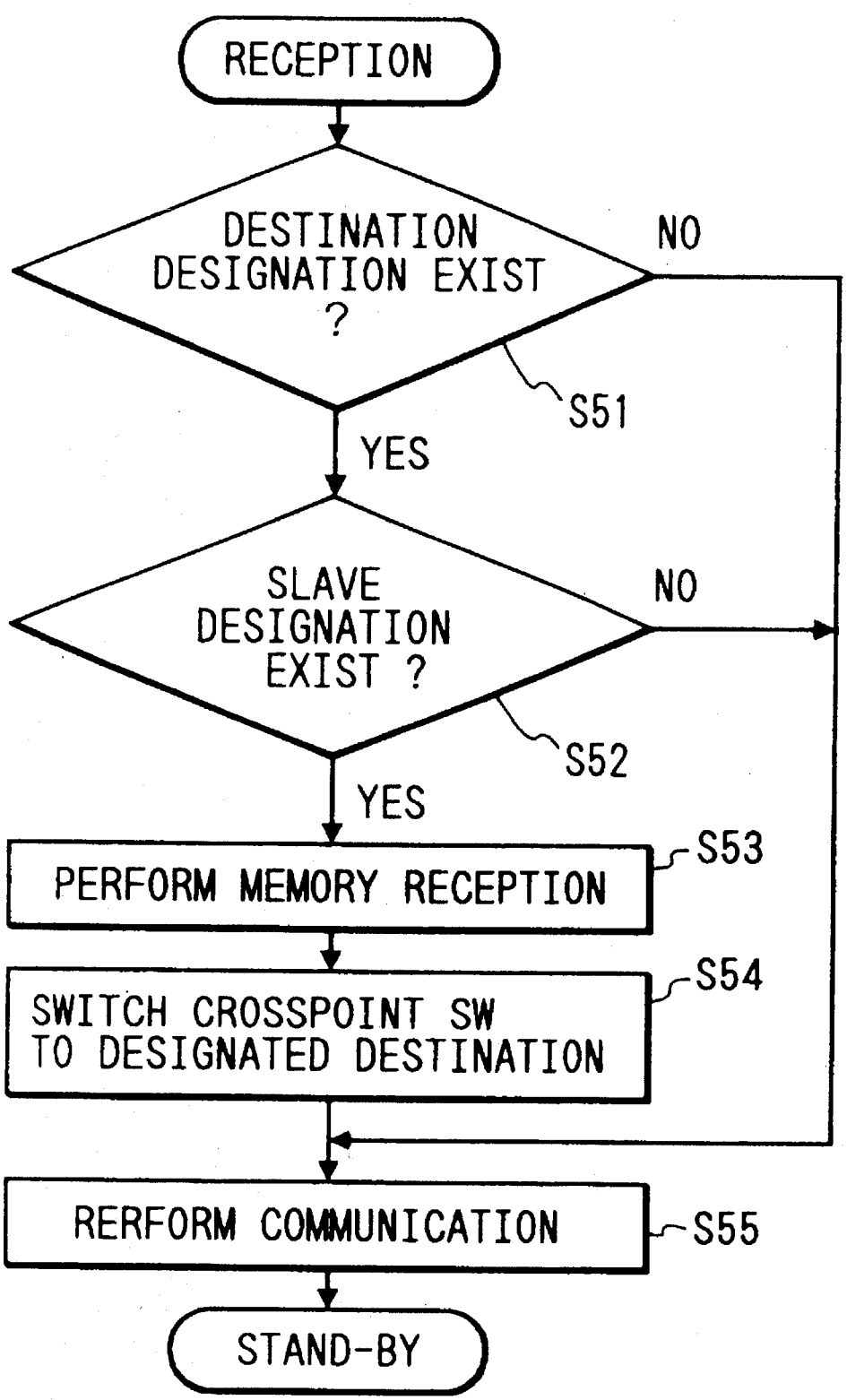
FIG. 7 shows a flow chart of an embodiment in a fifth embodiment.

FIG. 7 shows a flow chart of a reception operation in a fifth embodiment of the present invention.

In the fifth embodiment, the control unit 5 identifies the sending station based on an NSS (set non-standard function) or a TSI (identify sending terminal) received by the modem 24 in the preprotocol in the auto-receive mode. It also checks if the sending station has been registered in the RAM 7 or not (S51), and if it has not been registered, the master device effects the facsimile reception and the recorder 6 records the received image (S55).

If the sending station has been registered, whether the corresponding slave facsimile device has been registered or not is determined (S52). If the corresponding slave facsimile device has not been registered, the facsimile reception is effected by the master device and the received image is recorded by the recorder 6 (S55).

If the slave facsimile device has been registered for the data received from the sending station, the facsimile reception is effected by the RAM 7 (S53) and the cross-point switch 22 is switched and the corresponding facsimile device is activated by the pseudo-call signal from the call signal generator 23. Then, the received image is read from the RAM 7 and communicated through the extention line (S54).

Figure 8:
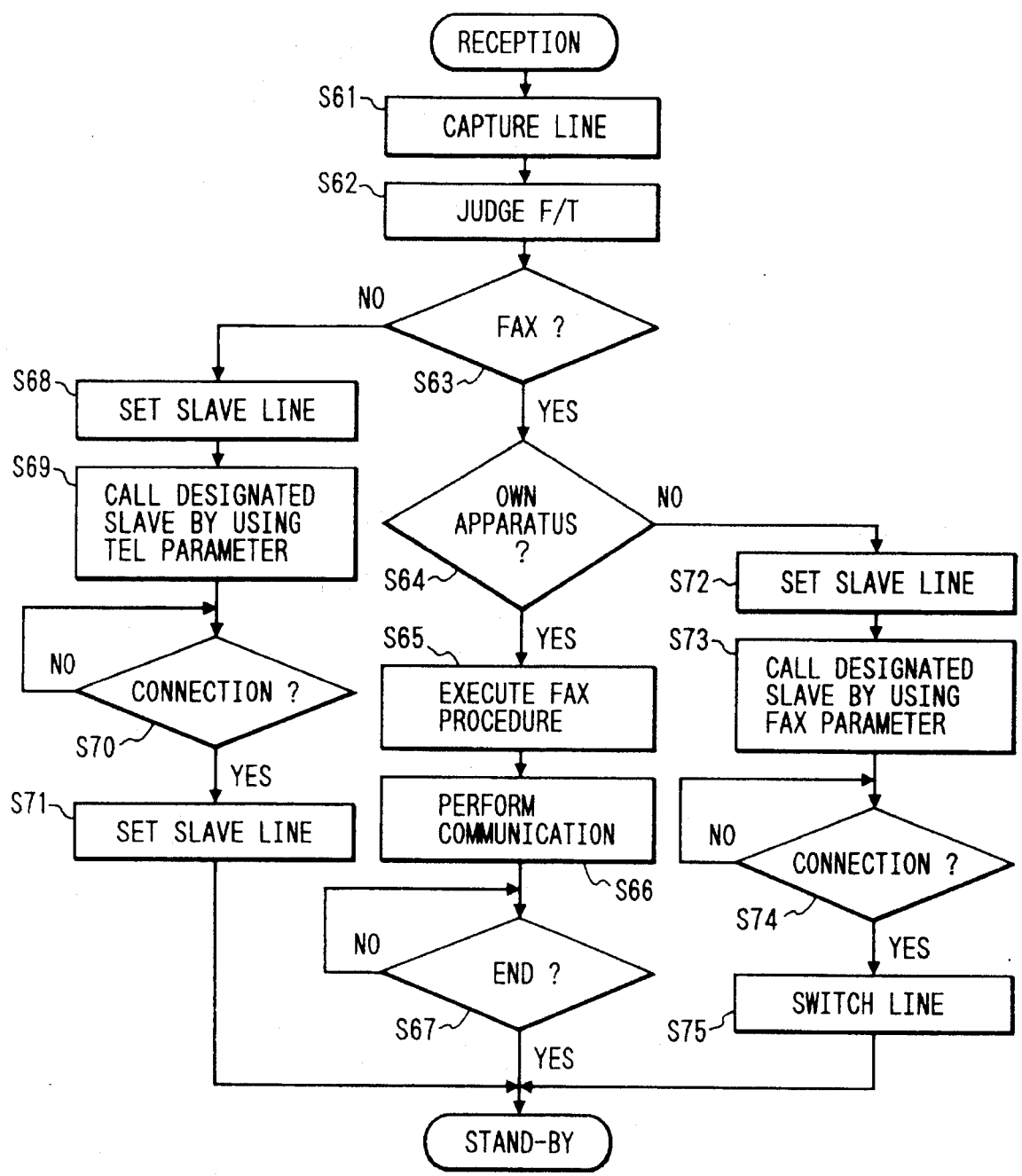
FIG. 8 shows a flow chart of an operation in a sixth embodiment.

FIG. 8 shows a flow chart of a reception operation in a sixth embodiment of the present invention.

In the sixth embodiment, when a call is detected, the control unit 5 controls the CML relay and the multi-point siwtch 22 to connect the line 9 to the modem 24 to capture the line (S61) and discriminate the facsimile device and the telephone set (F/T) (S62).

If the sending station is a human (S63), the control unit 5 sets the cross-point switch 22 (S68) and controls the call signal generator 23 by the pseudo-call signal parameters (on-time, off-time, frequency, etc.) registered in the RAM 7 so that the slave device registered in the RAM 7 or all slave devices connected when there is no registration are rung (S69). To reduce a loss in time, a call signal for the facsimile communication and parameters for calling the telephone set (on-time, off-time, frequency, etc.) are previously registered in the RAM 7. By using the call signal for the telephone, it is possible to inform to the slave device that the sending station is the telephone set without waiting for the reception of the call signal by the slave device. Alternatively, the F/T may be switched after the slave device has captured the line.

The control unit 5 determines whether the slave device has responded or not by the acknowledge detectors 25 and 26 (S70), and when it detects the acknowledgement by the slave device, it switches the multi-point switches to connect the line 9 to the responding slave device, and then it returns to the stand-by mode (S71).

Where the sending station is a facsimile device in S63, the control unit 5 refers the registration in the RAM 7 to determine whether the facsimile reception is to be effected by the master device or the slave device (S64). The decision in S63 may include a case where the master device is not ready to receive.

If the mode to receive by the master device has been registered in S63, the control unit 5 sends DIS to the line 9 by the modem 24 and executes the facsimile protocol to effect the communication (S65, S66).

Where the mode to call the slave device has been registered in S64, the control unit 5 switches the cross-point switch 22 (S72) and calls the slave device by the call signal generator 23 by the pseudo-call signal parameters for the communication registered in the RAM 7 (S73). Thus, the slave device need not discriminate F/T after the autoreception and may immediately shift to the facsimile communication. The master device determines whether the slave device has acknowledged or not (S74), and when it detects the acknowledgement, it switches the line and returns to the stand-by mode (S75).

Figure 9:
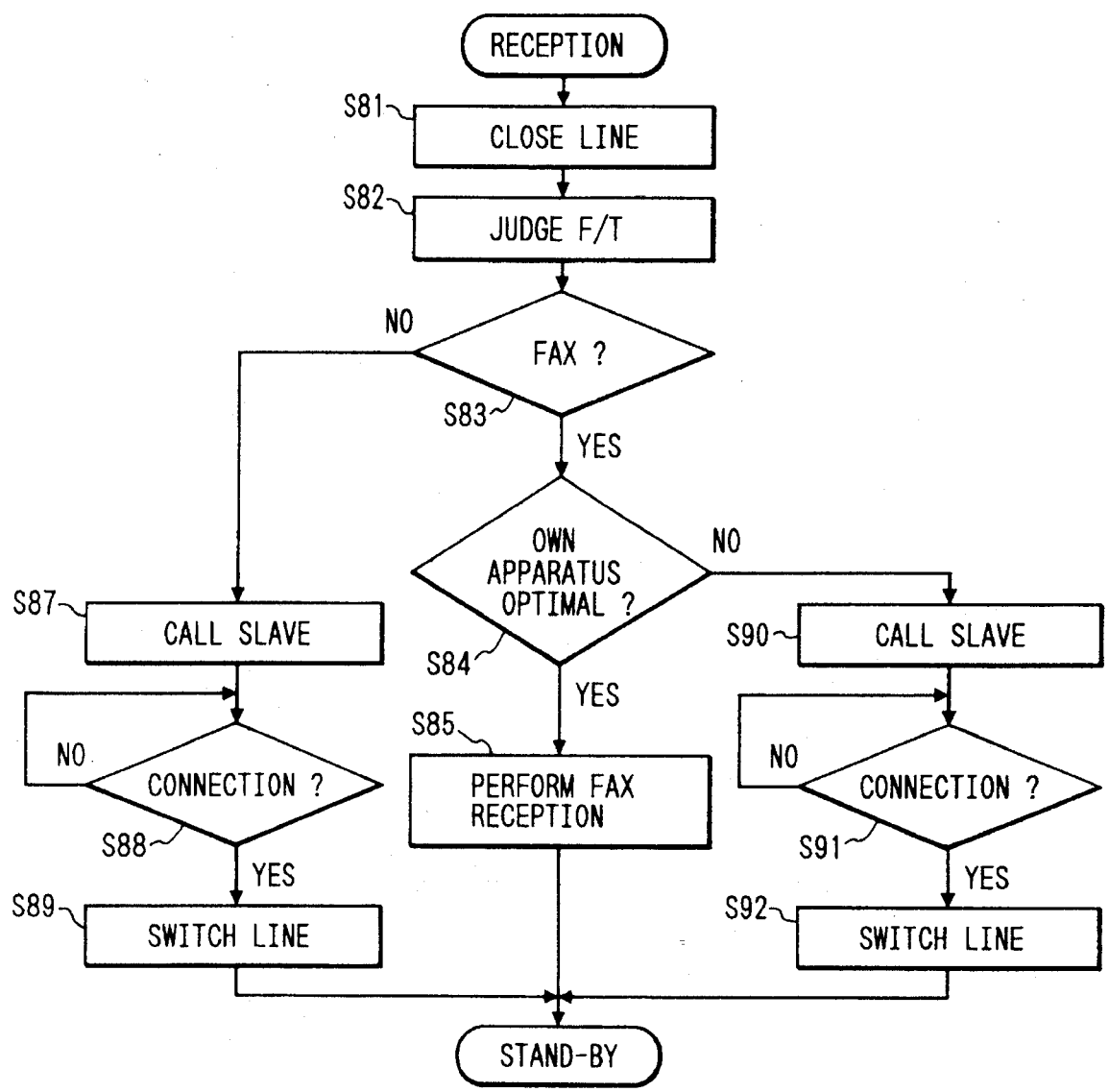
FIG. 9 shows a flow chart of an operation in a seventh embodiment.

FIG. 9 shows a flow chart of a reception operation in a seventh embodiment of the present invention.

In the seventh embodiment, the control unit 5 closes the line when the call is detected (S81) and discriminates F/T (S82). If the sending station is a telephone set in S82 (S83), the control unit 5 calls the slave device by the pseudo-call signal from the call signal generator 23 (S87). When it detects the acknowledgement by the slave device by the acknowledgement detectors 25 and 26 (S88), it switches the line and returns to the stand-by mode (S89).

If the sending station is a facsimile device in S82, the control unit 5 refers the information of the master device and the slave device stored in the RAM 7 to determine if there is a slave device which has a higher communication ability (error-free communication, high speed modem and high density recording) than that of the master device (S84). If there is such a slave device, the control unit 5 sends the pseudo-call signal to that slave device by the call signal generator 23 to activate the slave device (S90). It monitors the acknowledgement by the slave device (S91), and when it detects the acknowledgement by the acknowledgement detectors 25 and 26, it controls the multi-point switch 22 to switch the line 9 to connect the line 9 to the acknowledging slave device. Then, it returns to the stand-by mode (S92).

If the master device has the highest ability in S84, the facsimile communication is effected by the modem 24 (S85) and the control unit 5 then returns to the stand-by mode.

Figure 10:
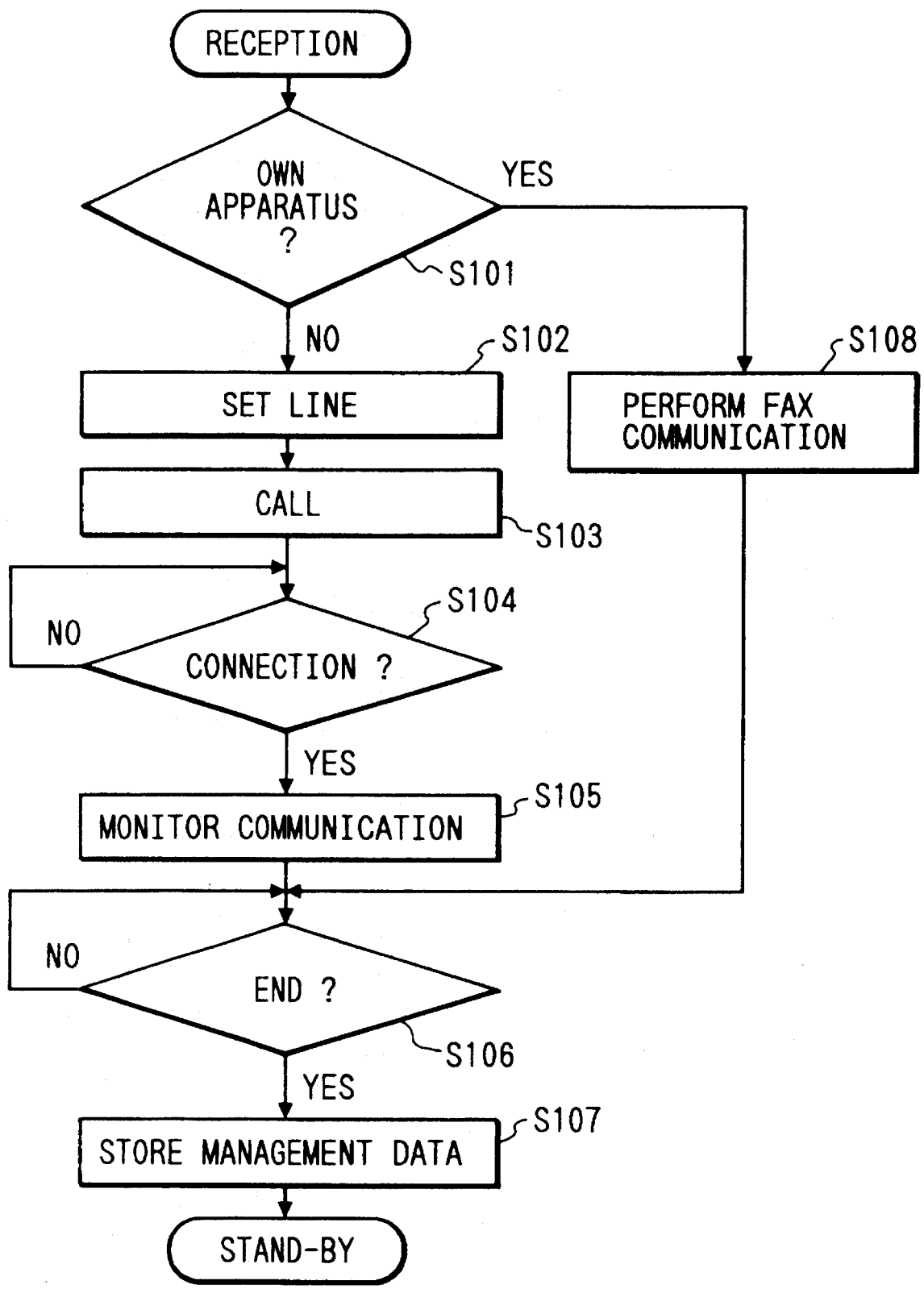
FIG. 10 shows a flow chart of an operation in an eighth embodiment.

FIG. 10 shows a flow chart of a reception operation in an eighth embodiment of the present invention.

In the eighth embodiment, when the control unit 5 detects a call, it determines the status of the receiving device in S101. If the master device is not ready to receive (no record sheet or memory overflow) or the mode to receive by the slave device has been registered in the RAM 7, the control unit 5 switches the relays h1 and h2 in S102 so that the line 9 is connected to the slave device. In S103, it sends a call signal to the slave device to be called from the call signal generator 23 and monitors the acknowledgement. When the connection is confirmed, the control unit 5 sets the cross-point switch 22 so that the modem 24 may monitor the communication between the line and the slave device (S105). The control unit 5 analyzes the protocol signals of both units by the modem 24 and when it detects the end of communication (S106), it stores the communication result in the communication management area of the RAM 7 (S107).

If the master device communicates in S101, the control unit 5 captures the line and effects the facsimile communication by the modem 24 (S108). Then, it stores the communication result in the communication management area (S107) and returns to the stand-by mode.

When a report key on the console unit 1 is subsequently depressed, the control unit 5 records the data of the communication management area of the RAM 7 by the recorder 6.

Figure 11:
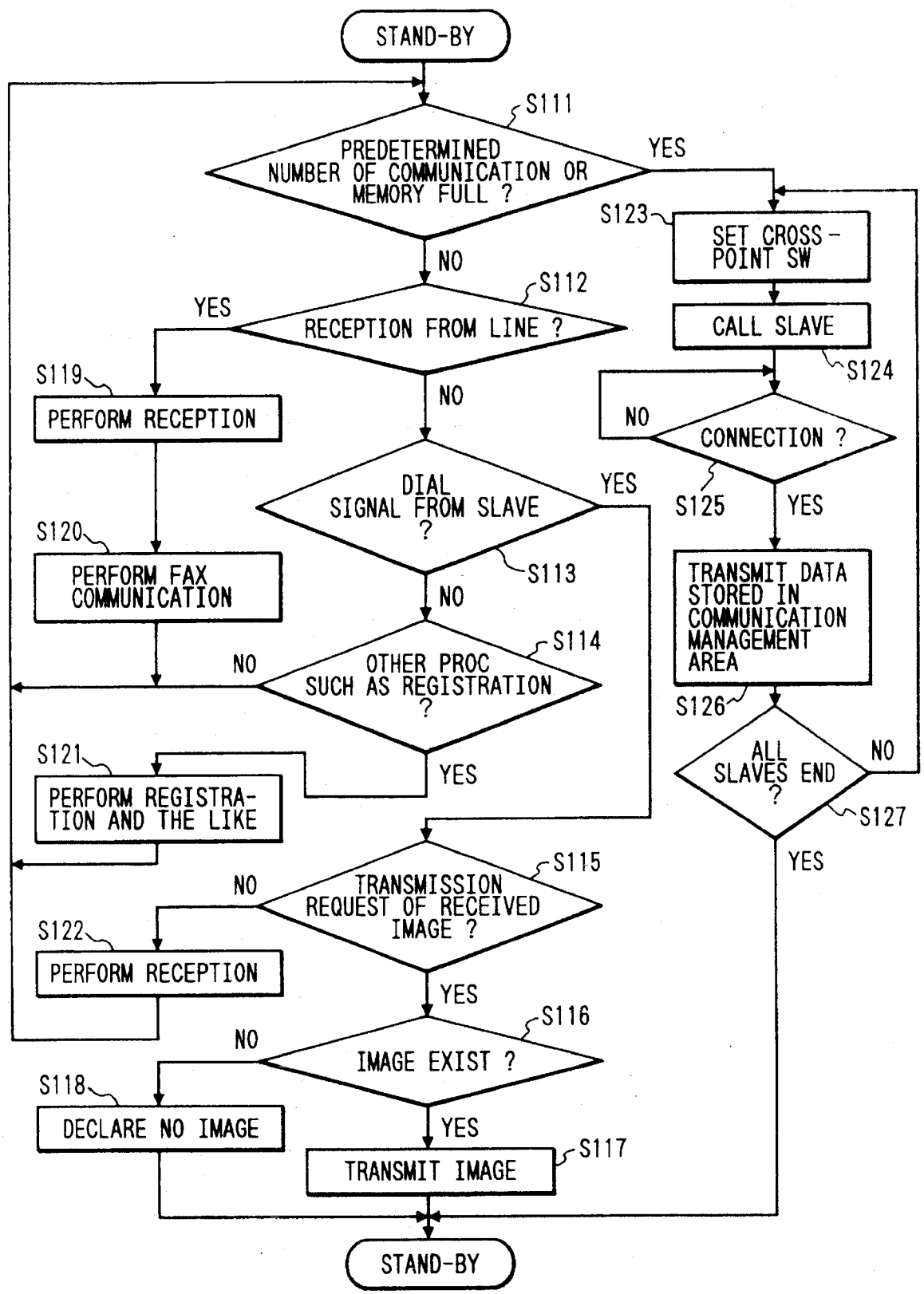
FIG. 11 shows a flow chart of an operation in a ninth embodiment.

FIG. 11 shows a flow chart of an operation in a ninth embodiment of the present invention.

In the ninth embodiment, the control unit 5 checks the number of communication the memory capacity, the signal received from the line 9, the dialing signal from the slave device, various registration and the report output in the stand-by mode, and conducts various processings when it is activated.

In S111, if the communication by the modem 24 or the slave facsimile device 10 or 11 reaches the number registered in the RAM 7, the control unit 5 sends the communication management information to the slave device. It first sets the cross-point switch 22 (S123), sends the pseudo-call signal to the destination slave device from the call signal generator 23 to activate the slave device (S124). It monitors the acknowledgement by the slave device (S125), and when it detects the acknowledgement, it effects the facsimile communication to send the information stored in the communication management information area (S126). This process is repeated for all slave devices to which the information is to be sent (S127), and when the information has been sent to all slave devices, the control unit 5 returns to the stand-by mode.

If the call signal from the line 9 is detected in S112, the control unit 5 shifts to the receive operation in S119 and effects the facsimile communication by the modem 24 (S120). Then, it returns to the stand-by mode. When control unit 5 determines by the modem 24 that the sending station is a facsimile device, it counts up the number of communication but if it is not a facsimile device, the control unit 5 does not count up the number of communication. The control unit 5 stores the communication result in the communication management area of the RAM 7.

When the request to process registration or report from the console unit 1 is detected in S114, the control unit 5 processes the request but it does not count up the number of communication.

When a predetermined dialing signal from the slave device is detected in S113, the control unit 5 receives the NSS (set non-standard function) of the pre-protocol or the DTMF signal from the slave device by the modem 24 to determine if it is a request to transfer the image received in the RAM 7 or not (S115). The received image may be designated by a serial number of the communication management information. The dialing signal may be detected by detecting the connection and disconnection of the loop by the acknowledgement detectors 25 and 26.

When the master device receives a send request command, the control unit 5 determines if the image has been stored in the RAM 7 or not (S116), and if the designated serial number is not found in the communication management information or if there is no image by an error, it effects an error process (to declare no image to the slave device) and returns to the stand-by mode.

When the corresponding image is found in S116, the control unit 5 reads the designated image from the RAM 7, modulates it by the modem 24 and sends it to the slave device (S117). Then, it returns to the stand-by mode.

When the send request command is not received in S115, the control unit 5 receives the image sent by the slave device (S122).

Figure 12:
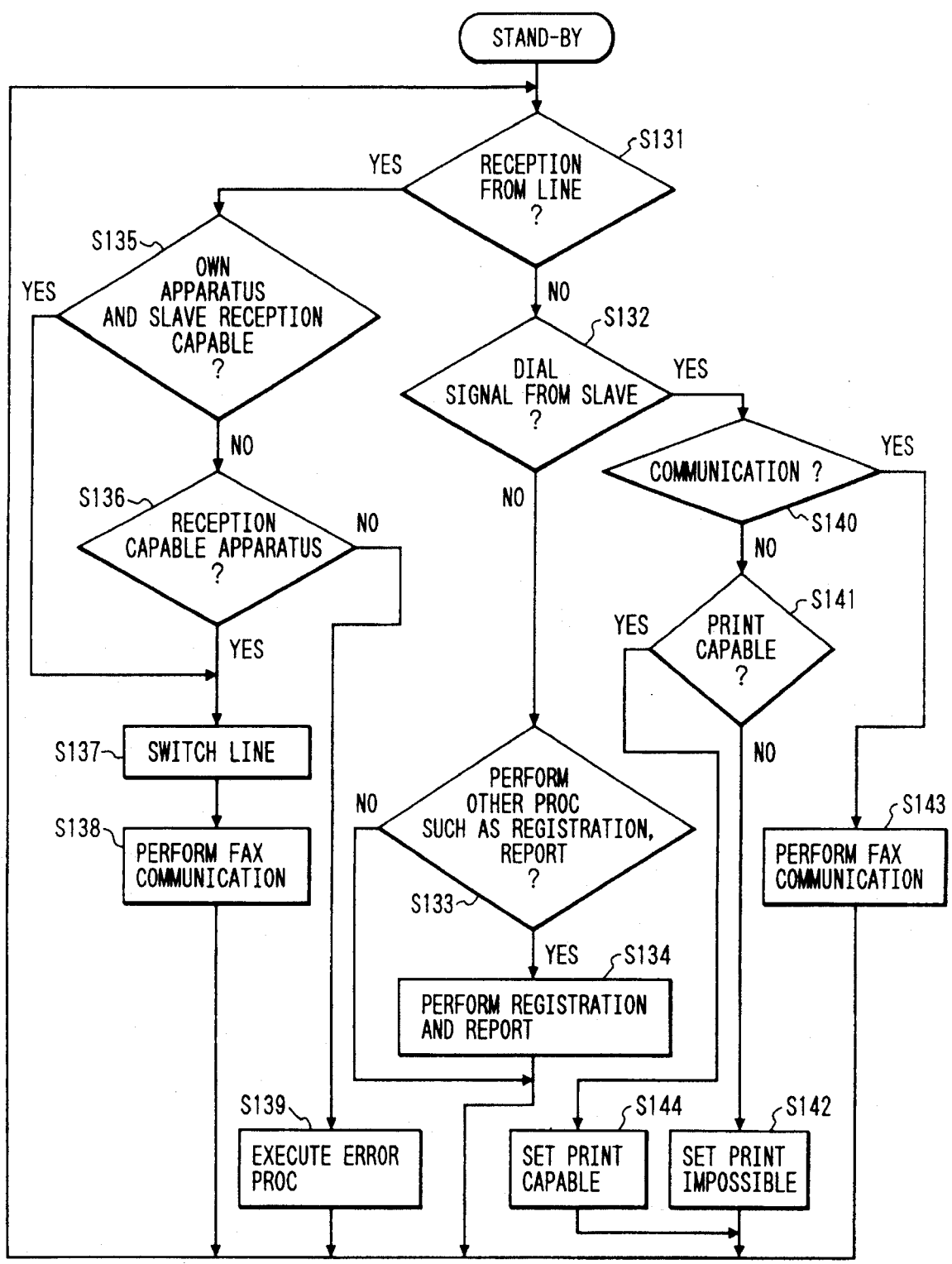
FIG. 12 shows a flow chart of an operation in a tenth embodiment.

FIG. 12 shows a flow chart of an operation of a tenth embodiment of the present invention.

In the tenth embodiment, the master device checks the call signal from the line 9, the dialing signal from the slave device, the registration and the report in the stand-by mode, and conducts various processings when it is activated.

In S131, when the call signal from the line 9 is detected, whether the master device is ready to receive or not is checked in S135. If the master device or the slave device designated by the registration is not ready to receive because of no record sheet or memory overflow, the control unit 5 determines whether there is other device which is ready to receive, in S136. If there is one, the control unit 5 switches the line to that device in S137 and effects the communication in S138. If there is no device which is ready to receive in S136, the control unit 5 conducts an error process in S139 and returns to the stand-by mode.

If the dialing signal from the slave device is detected in S132, the control unit 5 controls the multi-point switch 22 to connect the sending slave device and the modem 24 and conducts the pre-protocol by the modem 24. In S140, whether it is normal communication or not is determined. If it is the normal communication, the control unit 5 conducts the facsimile communication by the modem 24 (S143). After the communication, it returns to the stand-by mode. In S140, if it is the reception ready/not ready notice of the slave device by the NSS (set non-standard function) of the pre-protocol or the DTMF signal, the control unit 5 analyzes the command (S141) and registers the reception ready/not ready status of the slave device in the RAM 7 (S144, S142). Then, it returns to the stand-by mode and operates in that status until the status is updated.

When the slave facsimile device is not ready to receive, it sends the dialing signal to the master device to inform it.

When the process request for the registration or the report is detected in S133, the control unit 5 processes the request (S143).

In the above embodiments, the pseudo-call signal generator 23 is used to activate the slave facsimile devices 10 and 11. Assuming that the facsimile device is connected to the terminal of the signal generator 23 and it has a function of non-ringing reception upon reception of a call signal at 1300 Hz, the slave device may be activated by sending a tonal signal from the modem 24 through the cross-point switch 22.

While the preferred embodiments of the present invention have been described, the present invention may be modified without departing from the scope of claims.

The facsimile devices 10, 11 and 12 may be G4 facsimile devices. In this case, a circuit which analyzes a command is provided in place of the call signal detector 21 and the modem 24 in order to detect the signal from the communication line 9. A circuit for sending and receiving the command is also provided for each of the facsimile devices 10 and 11 in order to send and receive signals to and from the facsimile devices 10 and 11. A memory time switch for digital switching is provided in place of the multi-point switch 22.

What is claimed is:

1. An image communication apparatus capable of accommodating an extension terminal, comprising communication means for receiving an image signal from a line and sending the image signal to the extension terminal;

memory means for storing the image signal received from the line by said communication means;

record means for recording the image signal received from the line by said communication means; and connection means for selectively connecting the extension terminal, said communication means and the line;

said communication means sending the image signal stored in said memory means to the extension terminal through said connection means.

2. An image communication apparatus according to claim 1, wherein said communication means sends the image signal to one of a plurality of extension terminals which meets a time condition.

3. An image communication apparatus according to claim 1, wherein said communication means sends the image signal to an extension terminal corresponding to a sending station of the image signal received.

4. An image communication apparatus according to claim 1, wherein said communication means determines whether a sending station connected through the line is an image sending terminal or not and sends a call signal to the extension terminal in accordance with the determination.

5. An image communication apparatus according to claim 1, wherein said communication means discriminates communication functions of a plurality of extension terminals and sends the image signal to one of the extension terminals in accordance with the discrimination.

6. An image communication apparatus according to claim 1, wherein said communication means receives a signal representing a disability of reception of the image signal from the extension terminal and sends the image signal to the extension terminal in accordance with the received signal.

7. An image communication apparatus according to claim 1, wherein said memory means stores a plurality of images, and said communication means receives a signal specifying one of the images stored in said memory means from the extension terminal and sends the image corresponding to the received signal to the extension terminal from said memory means.

8. An image communication apparatus according to claim 1, wherein said communication means sends the image signal stored in said memory means to the extension terminal when the image signal cannot be recorded by said record means.

9. An image communication apparatus according to claim 1, wherein said communication means sends the image signal stored in said memory means to the extension terminal when an image size of the image signal received from the line does not match a record size of said record means.

10. An image communication apparatus comprising:

connecting means for connecting a plurality of extension terminals;

discriminating means for discriminating whether or not a calling party is another image communication apparatus after a responding to an incoming call;

generating means for generating plural kinds of calling signals in accordance with a result of discrimination by said discrimination means; and providing means for providing the generated calling signals to the plurality of extension terminals.

11. An apparatus according to claim 10, wherein said generating means generates a first calling signal in a case where the calling party is the other image communication apparatus, and generates a second calling signal in a case where the calling party is not the other image communication apparatus.

12. An apparatus according to claim 11, wherein an on-time and an off-time of the first calling signal are different from that of the second calling signal.

13. An apparatus according to claim 11, wherein a frequency of the first calling signal is different from one of the second calling signal.

* * * * *